Patented Dec. 27, 1949

2,492,145

UNITED STATES PATENT OFFICE 2,492,145

REFINING PROCESS FOR ROSIN

Burt L. Hampton, Jacksonville, Fla., assignor, by mesne assignments, to The Glidden Company, Cleveland, Ohio, a corporation of Ohio No Drawing. Application February 23, 1946, Serial No. 649,773

15 Claims. (Cl. 260—106)

This invention relates to improvements in rosin; and more particularly it relates to an improved process for stabilizing rosin and for improving its color.

The ordinary rosin of commerce, while used in large amounts, possesses certain inherent disadvantages. For one thing, its color is often poor, and even the highest grades of rosin leave much to be desired in this respect. An even greater disadvantage is its instability. Rosin contains two unsaturated double bonds and is readily oxidized and darkened on exposure to air. This instability is also carried over into its ordinary esters and reaction products.

Attempts have been made to stabilize rosin by heating with a catalyst, but the catalysts heretofore proposed have been so expensive or so inefficient as to make their commercial use limited to relatively high priced or special products. As a result this method of stabilization has not been used for large scale production of relatively inexpensive products.

The product obtained by treating rosin with hydrogenation catalysts but in the absence of hydrogen is largely a mixture of resin acids similar to the pyroabietic acids formed by heating rosin at elevated temperatures for a long period of time and which consist largely of a mixture of dehydroabietic acid and dihydroabietic acid together with products of unknown constitution.

It is also known that long heating of rosin at elevated temperatures produces disproportionation of the rosin with the consequence that there is stabilization. Heat treated rosins contain some dehydroabietic acid and, therefore, are somewhat more stable. However, in order to produce any practical stabilization, it is necessary to heat for such long periods that the process is impractical and moreover the long heating results in darkening and thermal decomposition of the rosin.

Stabilization by hydrogenation has also been proposed.

I have now found that small quantities of selenium and operable equivalents, which are compounds which readily yield selenium under the conditions of reaction, on heating with rosin and various derivatives of rosin in the presence of small amounts of added acid, readily reduce the unsaturation of these products thereby increasing their value, particularly for compositions such as adhesives, paints, varnishes, soaps, sizes, etc., where oxidation is undesirable. Since my products contain substantial quantities of dehydroabietic acid or derivatives, they may be used as a source of these products. I have found further that under certain conditions hereinafter exemplified, selenium and its derivatives may lighten the color of the resinous material very substantially as well as reduce its unsaturation.

Selenium has been used for dehydrogenation of resin acids but in much larger proportions than I employ and with the object of completely dehydrogenating, demethylating and decarboxylating these acids to their purely aromatic nucleus. In this way abietic acid may be converted to retene. My object, however, is entirely different. I wish to retain the carboxyl and methyl groups of abietic acid while aromatizing only one ring of the abietic acid nucleus by causing dehydrogenation and/or disproportionation of that ring. Other reactions probably take place also to produce other stable resin acids of low unsaturation such as dihydroabietic acid.

It is an object of the present invention to provide a process for producing selenium-stabilized rosin of improved color.

Another object is to provide an improved process for upgrading and stabilizing rosin.

A further object is to provide a process for producing very light grades of stabilized rosin.

Other objects will be apparent to those skilled in the art from the description of the invention.

I have found that the quantities of selenium required for reducing unsaturation are far less than would be required for simple dehydrogenation particularly when the selenium is employed in the presence of activating acids. The action of the selenium is, therefore, at least partly catalytic.

By the present process, substantial quantities of resin acids are converted into dehydroabietic acid which is an aromatic compound, whereas the original abietyl group is a hydroaromatic group. This aromatization results in increased stability. Since aromatic compounds are rather easily sulfonated, sulfonation may be employed as a measure of the stability of the products produced by the present process. Direct gain in weight of samples exposed to air or other measures of unsaturation, such as iodine number, may also be employed to determine the degree of stabilization of the product.

Most gum rosins are dextro-rotatory and upon heating rapidly become levo-rotatory. Dehydroabietic acid is strongly dextro-rotatory, and consequently the optical rotation of the product may be used as an indication of its stability by comparison with a blank similarly treated but without selenium or acid.

In co-pending application, Serial No. 431,836 filed February 21, 1942, now abandoned, of which I am one of the joint inventors, a process is disclosed for stabilizing rosin by treatment with selenium, but without acid. In practicing the invention of that application, the amount of selenium may vary from .01 to 5.0% and the temperature from 200 to 375° C. The time may vary depending upon the amount of selenium and the temperature, but is sufficient to decrease the degree of unsaturation without aromatization of substantially more than one ring of the rosin molecule as determined by a sulfonation test. Under these conditions the color of the product is better than is obtained by the same heat-treatment without selenium. In accordance with the present invention, however, wherein the selenium heat-treatment is conducted in the presence of acids, stabilized products of exceptionally light color can be secured, while the stabilizing effects of the treatment are substantially the same as those obtained by the above-described treatment without acid; that is, the degree of unsaturation of the rosin molecule is decreased without producing aromatization of substantially more than one ring of the nucleus.

In practicing this invention, the temperatures and amounts of selenium indicated above may be used, but it is preferable to use from about .05 to 1% selenium; to add from a trace to about 2% of acid; and to conduct the heat treatment at 250° to 300° C. for from two to three hours. Under these conditions remarkably light colored stabilized products are produced. Temperatures above about 350° C. should be avoided because of the undue decarboxylation that is apt to accompany such temperatures. Also, for best results, the bringing of the reaction mixture up to temperature and the cooling after the treatment are effected in a non-oxidizing atmosphere such as carbon dioxide. During the heat-treating stage, however, there is no particular advantage in maintaining such an atmosphere since the volatile products which are formed at this stage maintain a suitably protective atmosphere.

The indicated amounts of selenium may be introduced in the form of elemental selenium or may be derived in the reaction mass from selenium compounds such as oxides or halides which yield selenium under the conditions of treatment.

Any acid which is stronger than rosin acids may be employed. The amounts required are quite small, 2% by weight of the rosin being sufficient for weak acids such as acetic, stearic, and formic acids. Smaller amounts to mere traces are required for comparable results in the case of the stronger acids, and care should be exercised that the amount used should not be so great as to cause any substantial amount of destruction of the rosin. Less than .1% of such strong acids is generally adequate. Among the strong acids which have been used in such small amounts and found successful may be mentioned phosphoric, sulfuric, hydrochloric and oxalic.

In addition to resulting in upgrading, the acid minimizes or prevents the appearance of fluoresence when small amounts of metals are present in the rosin or when metal reaction vessels are used in the treatment. When larger amounts of metals are in the rosin or in the gum from which the rosin is run, and freedom from fluorescence is desired, the material should be acid washed to remove the metals before being subjected to heat-treatment with selenium and acid.

The following examples are illustrative of the invention and of the products produced and represent preferred treatments according to the present invention.

EXAMPLE I

N grade rosin having an acid number of 168, ring and ball melting point of 76° C. and specific rotation of $(alpha)_D = +15°$, was heated while passing carbon dioxide through the mass. The selenium and acid were added at 220° C. The reaction mass was heated at 275-285° C. for two to three hours and then cooled under carbon dioxide to 160-175° C. and then poured. The following table sets forth the variations in procedure and the products resulting therefrom.

Table

| Experiment No. | Percent Se | Percent Acid | Time | Product | | | |
|---|---|---|---|---|---|---|---|
| | | | | Grade | R & B M. P. | A. N. | $(alpha)_D$ |
| | | | Hours | | | | Degrees |
| 1 | None | None | 3 | WG | 78 | 153 | −8 |
| 2 | None | .008 H₃PO₄(85%) | 2 | WG | 82 | 157 | +2 |
| 3 | 0.15 | None | 3 | WW | 74.5 | 145 | +43 |
| 4 | 0.15 | .008 H₃PO₄(85%) | 3 | 3A | 75 | 148 | +29 |
| 5 | 0.15 | .004 H₃PO₄(85%) | 2 | 3A | 77 | 151 | +23 |
| 6 | 0.75 | .008 H₃PO₄(85%) | 3 | X | 78 | 150 | +46 |
| 7 | 0.15 | .008 HAc | 3 | 3A | 71 | 161 | +25 |
| 8 | 0.15 | .008 H₂SO₄ | 3 | 3A | 75 | 154 | +35 |
| 9 | 0.30 | 2.0 Stearic | 3 | 3A | 69 | 153 | +38 |
| 10 | 0.30 | 0.2 HCOOH | 3 | 3A | 75 | 154 | +40 |
| 11 | 0.30 | .015 HCl Conc. | 3 | 5A | 70 | 150 | +41 |
| 12 | 0.30 | .06 Oxalic | 3 | 5A | 72 | 147 | +47 |
| | | Original Rosin | | N | 76 | 168 | +15 |

The grades 3A and 5A are according to the French scale and both are lighter in color than the United States Department of Agriculture standard for grade X. It will be noted that in every instance when both selenium and acid were used, the product was at least three grades better than the starting rosin, that the products were at least one grade better when both selenium and acid was used than when neither or only one of these materials were used, and that in the absence of selenium the acid had no effect in raising the grade of the product.

The optical rotations are used to indicate the degree of stabilization. Rosin shows a moderately positive optical rotation. However, when heated, this positive rotation decreases to near zero and may become negative and upon prolonged heating again becomes positive. However, this severe heating causes excessive discoloration and decarboxylation. When heated with selenium, the rotation again becomes positive with much less heating and without the thermal decomposition attendant upon a simple heat treatment. Dehydroabietic acid is dextro-rotatory and consequently the optical rotation may be used as an indication of the degree of stabilization. Reference to the table clearly shows that the amount of acid is not critical within the ranges indicated previously. It will be noted however, that even "trace" amounts of acid are effective.

EXAMPLE II

N wood rosin was heated to 180° C. and 0.008% phosphoric acid added with 0.15% of selenium with stirring and while passing in carbon dioxide gas. The reaction mass was heated at 275°–285° for 3 hours. The product had an acid number of 150; a ring and ball M. P. of 66.5; $\text{alpha}_D = +25°$ and graded 5A.

EXAMPLE III

K gum rosin was heated to 180° C. and about .004% phosphoric acid and 0.3% selenium added. The reaction mixture was heated at 275–285° C. for 3 hours. The product had an acid number of 144, a melting point of 68.5 (R. & B.), $$\text{alpha}_D = +45°$$

and graded WG to WW.

EXAMPLE IV

H gum rosin was washed with dilute phosphoric acid and then twice with water. The resulting M grade rosin was heated to 170° C. and 0.3% selenium and about .01% (2 drops for 380 g. rosin) phosphoric acid added. The reaction mixture was heated at 275–285° C. for three hours. The product was lighter than the standard for grade X, had an acid number of 144.5, and $\text{alpha}_D = +47°$.

EXAMPLE V 1200 parts of K gum rosin of M. P. 80°, A. N. 166, $\text{alpha}_D = +20°$, was heated at 275–285° C. with .01% Se and about .008% $H_3PO_4$. Stirring with exclusion of air was used.

| Time in Minutes after reaching 275° C. | Grade | M. P. | A. N. | Alpha $_D$ |
|---|---|---|---|---|
| 5 | K+ | 82 | 166 | −11° |
| 10 | K+ | 82 | 165 | −8.5 |
| 20 | M | 82 | 163 | −5 |
| 35 | M | 83 | 161 | −1.5 |
| 60 | N | 82 | 160 | 0 |
| 105 | N+ | 80 | 155 | +8 |
| 160 | WG | 79 | 149 | +10 |
| 180 | WG | 76 | 146 | +11.5 |

From the preceding examples it will be recognized that the treatment of this invention may be applied to upgrade all grades of rosin. In the case of the lower grades of rosin, they may be brought up to higher grades. Where high-grade rosins are treated initially, the color may be lightened so much that it brings the rosin into the French grading scale (A series).

A suitable sulfonation test (for use in determining the degree of aromatization produced by the treatment of this invention) may be made by sulfonating a 50 gram sample with 200 cc. concentrated sulfuric acid at 10°–15° C., pouring the reaction mixture into one liter of water, separating the crude sulfonation product from the dilute sulfuric acid, and extracting the water-soluble sulfodehydroabietic acid with boiling water.

The term "free selenium" is used in the following claims to refer to selenium which is available in the reaction mass for the herein-described purposes, whether it be elemental selenium or selenium derived from selenium compounds. The term "metal-free rosin" is used to refer either to rosin which initially has a low or negligible metal content, or to rosin which initially contains substantial amounts of metal and which has been acid washed to reduce its metal content to a low or negligible value.

Having described the invention, what is claimed is:

1. The process for upgrading rosin which comprises treating a substantially metal-free rosin with from 0.01 to 1% of free selenium at a temperature of 200° C. to 300° C. in the presence of a small amount of added acid which is stronger than rosin acids for a time sufficient to decrease the degree of unsaturation without aromatization of substantially more than one ring of the nucleus.

2. The process for upgrading rosin which comprises heating a substantially metal-free rosin with from .05 to 1% of free selenium at a temperature of 250° to 300° C. for from 2 to 3 hours in the presence of a trace up to 2% of an added acid which is stronger than rosin acids but insufficient in strength and amount to cause substantial destruction of the rosin during the treatment.

3. The process of upgrading rosin which comprises heating a substantially metal-free rosin with from .05 to 1.0% of free selenium at a temperature of 250°–300° C. for 2 to 3 hours in the presence of a small amount of acid stronger than rosin acids but insufficient in strength and amount to cause substantial destruction of the rosin.

4. A process for effecting substantial improvement in the color of low grade rosins, said processing comprising the steps of: subjecting said rosin to an acid-washing treatment to render said rosin substantially free of metals; and heating said washed rosin with from about .05% to 1% of free selenium at temperatures between about 250° C. and 300° C. for a time period of between 2 and 3 hours in the presence of from a trace to about 2% of acid which is stronger than rosin acids but insufficient in strength and amount to cause substantial destruction of the washed rosin.

5. A process for upgrading a metal-free rosin which comprises the steps of: heating said rosin under non-oxidizing conditions to a treating temperature between about 200° and 300° C.; treating the heated rosin between said temperatures with from .01% to 1% of free selenium in the presence of a small amount of added acid which is stronger than rosin acids for a time sufficient to decrease the degree of unsaturation without aromatization of substantially more than one ring; and cooling the treated rosin under non-oxidizing conditions to a temperature below about 175° C.

6. A process for upgrading a metal-free rosin which comprises the steps of: heating said rosin under non-oxidizing conditions to a treating temperature between about 250° C. and 300° C.; treating the heated rosin between said temperatures with from .05% to 1% of free selenium for from two to three hours in the presence of a trace up to 2% of an acid which is stronger than rosin acids but insufficient in strength and amount to cause substantial destruction of the rosin during the treatment; and cooling the treated rosin under non-oxidizing conditions to a temperature below about 175° C.

7. A process for effecting substantial improvement in the color of metal-containing rosins, said process comprising the steps of: subjecting said rosin to an acid-washing treatment to render said rosin substantially free of metals; heating said rosin under non-oxidizing conditions to a treating temperature between about 250° C. and 300° C.; treating the heated rosin between said temperatures with from .05% to 1% of free selenium for from two to three hours in the presence of a trace up to 2% of an acid which is stronger than rosin acids but insufficient in strength and amount to cause substantial destruction of the rosin during the treatment; and cooling the treated rosin under non-oxidizing conditions to a temperature below about 175° C.

8. The process as claimed in claim 1 wherein the small amount of acid is a trace to .1% of a strong acid.

9. The process as claimed in claim 2 wherein the small amount of acid is a trace to .1% of a strong acid.

10. The process as claimed in claim 3 wherein the small amount of acid is a trace to .1% of a strong acid.

11. The process as claimed in claim 4 wherein the small amount of acid is a trace to .1% of a strong acid.

12. The process as claimed in claim 5 wherein the small amount of acid is a trace to .1% of a strong acid.

13. The process as claimed in claim 6 wherein the amount of acid is a trace to .1% of a strong acid.

14. The process as claimed in claim 7 wherein the amount of acid is a trace to .1% of a strong acid.

15. The process as claimed in claim 5 wherein the selenium is employed in amounts between .05% and .75%.

BURT L. HAMPTON.

REFERENCES CITED

The following references are of record in the file of this patent:

UNITED STATES PATENTS

| Number | Name | Date |
|---|---|---|
| 915,401 | Yaryan | Mar. 16, 1909 |
| 2,298,916 | Auer | Oct. 13, 1942 |